US009300858B2

(12) United States Patent
Sako et al.

(10) Patent No.: US 9,300,858 B2
(45) Date of Patent: Mar. 29, 2016

(54) CONTROL DEVICE AND STORAGE MEDIUM FOR CONTROLLING CAPTURE OF IMAGES (71) Applicant: SONY CORPORATION, Tokyo (JP)

(72) Inventors: Yoichiro Sako, Tokyo (JP); Kazuhiro Watanabe, Tokyo (JP); Takatoshi Nakamura, Tokyo (JP); Kazuyuki Sakoda, Chiba (JP); Kazunori Hayashi, Tokyo (JP); Takayasu Kon, Tokyo (JP); Tomoya Onuma, Shizuoka (JP); Akira Tange, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/267,347

(22) Filed: May 1, 2014

(65) Prior Publication Data
US 2014/0368695 A1 Dec. 18, 2014

(30) Foreign Application Priority Data
Jun. 14, 2013 (JP) .................................. 2013-125826

(51) Int. Cl.
H04N 5/225 (2006.01)
H04N 5/232 (2006.01)
H04N 5/77 (2006.01)
H04N 9/79 (2006.01)

(52) U.S. Cl.
CPC ....... H04N 5/23212 (2013.01); H04N 5/23296 (2013.01); H04N 5/77 (2013.01); H04N 9/7904 (2013.01)

(58) Field of Classification Search
CPC . H04N 5/77; H04N 5/23212; H04N 5/23232; H04N 5/23238; H04N 2013/0088; H04N 9/7904
USPC ....................................................... 348/218.1
See application file for complete search history.

(56) References Cited

U.S. PATENT DOCUMENTS

| 8,035,725 | B2 * | 10/2011 | Chen et al. ..................... 348/349 |
| 8,482,651 | B2 * | 7/2013 | Asukai et al. ............. 348/333.12 |
| 8,648,927 | B2 * | 2/2014 | Kitagawa et al. .......... 348/222.1 |
| 8,928,737 | B2 * | 1/2015 | Christopher et al. ........... 348/46 |
| 2010/0066840 | A1 * | 3/2010 | Asukai ...................... G06T 5/50 348/36 |
| 2010/0265346 | A1 * | 10/2010 | Iizuka .................. H04N 13/025 348/218.1 |
| 2014/0307044 | A1 * | 10/2014 | Sharma .............. H04N 5/23229 348/36 |

FOREIGN PATENT DOCUMENTS

JP 08-110545 4/1996

* cited by examiner

Primary Examiner — Twyler Haskins
Assistant Examiner — Dwight C Tejano
(74) Attorney, Agent, or Firm — Paratus Law Group, PLLC

(57) ABSTRACT

There is provided a control device including a focus control unit configured to perform control so as to sequentially bring multiple subjects within a captured image into focus, and a recording control unit configured to perform control in response to a trigger from a user so as to record, onto a storage medium, captured images of the multiple subjects sequentially brought into focus by the focus control unit.

16 Claims, 10 Drawing Sheets

CONTROL DEVICE AND STORAGE MEDIUM FOR CONTROLLING CAPTURE OF IMAGES

CROSS REFERENCE TO RELATED APPLICATIONS

This application claims the benefit of Japanese Priority Patent Application JP 2013-125826 filed Jun. 14, 2013, the entire contents of which are incorporated herein by reference.

BACKGROUND

The present disclosure relates to control devices and storage media.

Digital cameras that have become widely available in recent years are equipped with a function for measuring the distance from a subject and automatically adjusting the focal point of an imaging lens. In detail, for example, a digital camera is equipped with a so-called active distance-measuring device that emits infrared light toward a subject and receives reflected light therefrom so as to measure the distance from the subject.

With regard to the technology of such a digital camera that automatically adjusts the focal point of the imaging lens in accordance with the distance from the subject, for example, JP H8-110545A is proposed.

JP H8-110545A discloses a camera configured such that, even when the camera erroneously detects that a subject is at infinity, the camera can photograph the subject without sacrificing the infinite depth of focus and also without sacrificing the blurriness of a subject at a finite distance as much as possible. Furthermore, the camera according to JP H8-110545A can prevent an out-of-focus state caused when the emitted light does not hit the subject and the subject is thus erroneously detected as a subject at infinity due to the inability to receive reflected light therefrom.

SUMMARY

However, although one subject within a photographing range (i.e., within the field of angle) is brought into focus in accordance with the distance from the subject in JP H8-110545A, an aspect of photographing multiple subjects by automatically focusing on the multiple subjects is not taken into account.

The present disclosure proposes new and improved control device and non-transitory computer-readable storage medium that allow for an imaging process by bringing multiple subjects within the angle of field into focus.

According to an embodiment of the present disclosure, there is provided a control device including a focus control unit configured to perform control so as to sequentially bring multiple subjects within a captured image into focus, and a recording control unit configured to perform control in response to a trigger from a user so as to record, onto a storage medium, captured images of the multiple subjects sequentially brought into focus by the focus control unit.

According to an embodiment of the present disclosure, there is provided a non-transitory computer-readable storage medium having a program stored therein, the program causing a computer to function as: a focus control unit configured to perform control so as to sequentially bring multiple subjects within a captured image into focus, and a recording control unit configured to perform control in response to a trigger from a user so as to record, onto a storage medium, captured images of the multiple subjects sequentially brought into focus by the focus control unit.

According to one or more of embodiments of the present disclosure described above, an imaging process performed by bringing multiple subjects within the angle of field into focus becomes possible.

DETAILED DESCRIPTION OF THE EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description below will proceed in the following order.
1. General Outline of Photographic Control System According to Embodiment of Present Disclosure
2. Basic Configuration
   2.1. Configuration of Digital Camera
   2.2. Configuration of Server
3. Operation
4. Another Embodiment
   4.1. Another Example of Focus Control
   4.2. Configuration of Stand-Alone Digital Camera
5. Conclusion

1. General Outline of Photographic Control System According to Embodiment of Present Disclosure First, the general outline of a photographic control system according to an embodiment of the present disclosure will be described with reference to FIG. 1.

Figure 1:
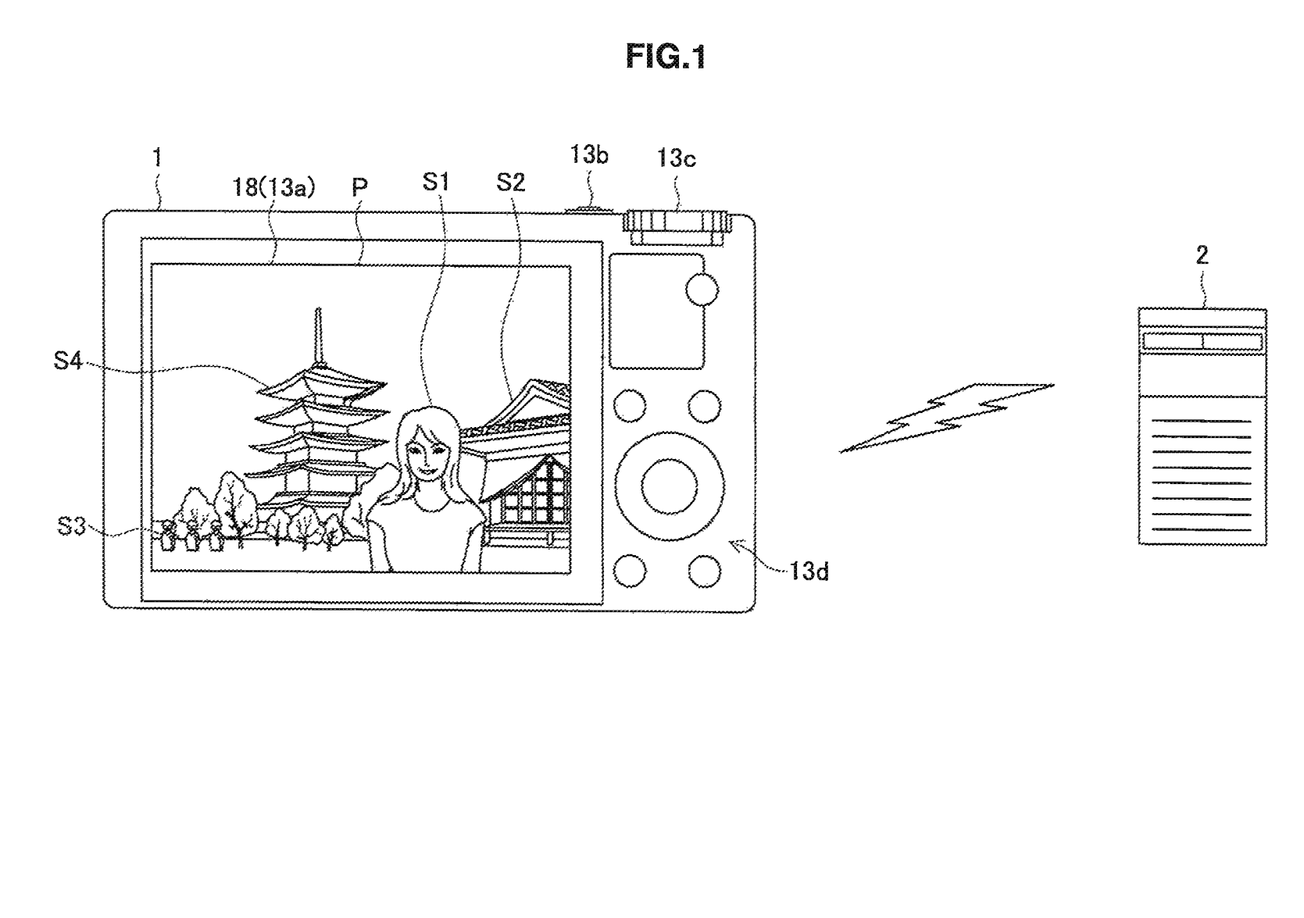
FIG. 1 schematically illustrates a photographic control system according to an embodiment of the present disclosure.

FIG. 1 schematically illustrates the photographic control system according to the embodiment of the present disclosure. As shown in FIG. 1, the photographic control system according to this embodiment includes a digital camera 1 (i.e., control device according to an embodiment of the present disclosure) and a server 2. The digital camera 1 and the server 2 are connected to each other in a wireless or wired manner so as to exchange data with each other. In detail, for example, the digital camera 1 is connected to a network via wireless communication, such as a wireless local area network (LAN) or Wi-Fi (registered trademark), or via wired communication so as to connect with the server 2 in the network, thereby exchanging data therewith.

As shown in FIG. 1, the digital camera 1 has a display unit 18 on one surface of a housing that constitutes the digital camera 1, and is provided with an imaging lens and a strobe light at a surface (not shown) opposite the surface provided with the display unit 18. The display unit 18 may be a touchscreen display laminated with a touch sensor 13a (an example of an operation input unit 13) and may be configured to detect user's operation performed on the display screen.

Furthermore, as shown in FIG. 1, an upper surface of the digital camera 1 is provided with a shutter button 13b, a zoom lever 13c, and a power on/off button (not shown).

Moreover, as shown in FIG. 1, various control buttons 13d, which include a menu button, a play button, an OK button, a delete button, and a mode switching button, are provided beside the display unit 18. The mode switching button is used for switching between shooting modes, such as a manual shooting mode, an automatic shooting mode, a panorama shooting mode, and a video shooting mode. The play button is used for playing back a captured image, stored in the digital camera 1, on the display unit 18.

When a user turns on the digital camera 1 and sets the shooting mode to a predetermined shooting mode, the user orients the imaging lens of the digital camera 1 toward a subject. The digital camera 1 collects light with the imaging lens and receives the light with an imaging element, such as a charge-coupled device (CCD), so as to continually display (in real time) a through-the-lens image P, which is digital data of a successively captured subject image, on the display unit 18. The user checks the state of framing while viewing the through-the-lens image P displayed on the display unit 18 in this manner and then presses the shutter button 13b at an arbitrary timing so as to perform photographing operation.

Normally, when focusing on a subject within the angle of field, the user adjusts the framing by moving the digital camera 1 so that the subject is displayed at the center of the through-the-lens image P (or a focus mark displayed on the display unit 18). Then, the user presses the shutter button 13b halfway so as to activate auto-focus. When the shutter button 13b is pressed halfway, the digital camera 1 measures the distance from the subject (also referred to as "shooting distance" or "subject distance") and adjusts the focal length of the imaging lens in accordance with the shooting distance so as to focus on the subject. Alternatively, the user may tap on a freely-chosen subject appearing in the through-the-lens image P so as to focus on the subject. The digital camera 1 measures the distance from the subject displayed at the tapped position and adjusts the focal length of the imaging lens in accordance with the shooting distance so as to focus on the subject.

However, in the normal control method described above, only one of multiple subjects S1, S2, S3, and S4 within the through-the-lens image P can be brought into focus, causing the other subjects to blur.

In the photographic control system according to the embodiment of the present disclosure, images of multiple subjects within the angle of field are captured by bringing them into focus, so that multiple photographic images focused on the respective subjects are acquired. Then, these multiple photographic images are combined, whereby a photographic image focused on the multiple subjects within the angle of field is provided. This allows for enhanced user-friendliness of the digital camera 1.

In detail, in response to pressing of the shutter button 13b, the digital camera 1 captures images of multiple subjects S1 to S4 within the angle of field by bringing them into focus, so as to acquire multiple photographic images focused on the respective subjects. Then, the digital camera 1 transmits these multiple photographic images to the server 2. In the server 2, the photographic images focused on the multiple subjects within the angle of field are combined. The combined photographic image may be transmitted back to the digital camera 1 and be presented to the user via the display unit 18, or may be stored in a user's storage area in a preregistered network.

The general outline of the photographic control system according to the embodiment of the present disclosure has been described above. Next, the configurations of the digital camera 1 (i.e., control device according to an embodiment of the present disclosure) and the server 2 included in the photographic control system according to this embodiment will be described in detail with reference to FIGS. 2 to 5.

Although the digital camera 1 is illustrated as an example of a control device according to this embodiment in the example shown in FIG. 1, the control device according to this embodiment is not limited thereto and may alternatively be, for example, a digital video camera, a portable telephone having an imaging function, a personal handy-phone assistant (PHS) having an imaging function, a smartphone having an imaging function, a personal digital assistant (PDA) having an imaging function, a head-mounted display (HMD) having an imaging function, a see-through HMD (eyeglasses HMD) having an imaging function, or a notebook-type personal computer having an imaging function.

Furthermore, the external appearance of the digital camera 1 shown in FIG. 1 is merely an example. The size and the set position of the display unit 18, and the positions and the presence or absence of the shutter button 13b, the zoom lever 13e, and the various control buttons 13d are not limited to those in the example shown in FIG. 1. For example, the display unit 18 may be provided so as to entirely cover one surface of the digital camera 1, and the functions of the shutter button 13b, the zoom lever 13c, and the various control buttons 13d may be realized by button images displayed on the screen of the display unit 18.

2. Basic Configuration

2.1. Configuration of Digital Camera

Figure 2:
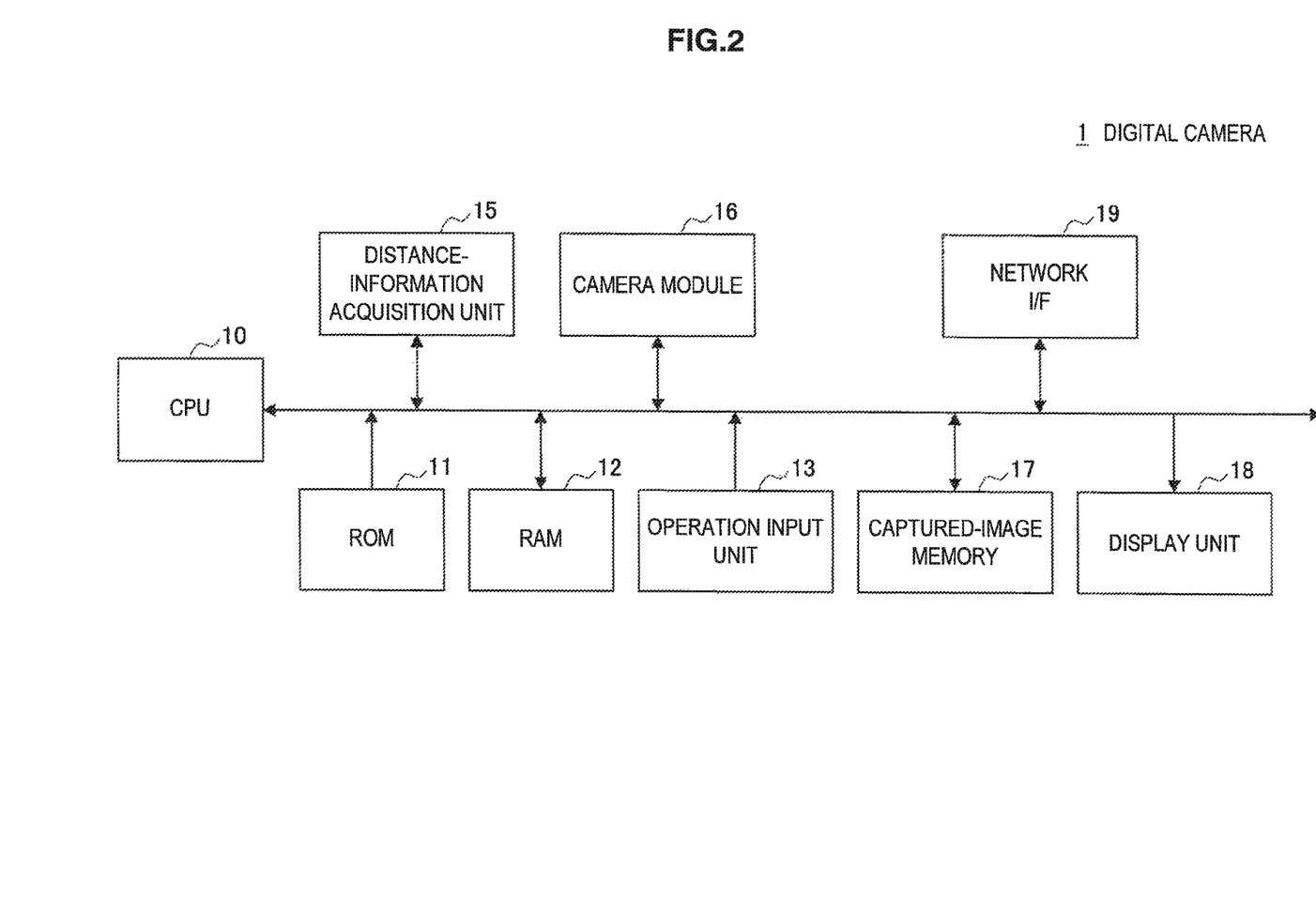
FIG. 2 is a block diagram illustrating an example of an internal configuration of a digital camera according to the embodiment.

FIG. 2 is a block diagram illustrating an example of an internal configuration of the digital camera 1 according to this embodiment. As shown in FIG. 2, the digital camera 1 according to this embodiment includes a central processing unit (CPU) 10, read-only memory (ROM) 11, random access memory (RAM) 12, the operation input unit 13, a distance-information acquisition unit 15, a camera module 16, a captured (photographic) image memory 17, the display unit 18, and a network interface (I/F) 19.

Operation Input Unit

The operation input unit 13 is a device that detects user's operation and receives an operation input. In detail, the operation input unit 13 is realized by a device for receiving user's operation. Such a device includes the touch sensor 13a laminated on the display unit 18, the shutter button 13b and the zoom lever 13c that are provided on, for example, the upper surface of the digital camera 1, the various control buttons 13d, and so on. The operation input unit 13 supplies information about the received operation input to the CPU 10. Alternatively, the operation input unit 13 may be realized by a microphone and an audio signal processor (not shown). By providing the microphone and the audio signal processor, an audio input by the user becomes possible.

Camera Module

The camera module 16 (i.e., imaging unit) includes an imaging optical system including the imaging lens, an imaging element, and an image signal processor. The imaging element is realized by, for example, a CCD imager or a complementary metal oxide semiconductor (CMOS) imager. The image signal processor can perform, for example, noise reduction, gray-level correction, color correction, distortion correction, blur correction, and image compression and expansion.

The camera module 16 acquires multiple captured images focused on multiple subjects in accordance with control performed by the CPU 10. When the subjects are to be brought into focus, distance information (i.e., subject information) acquired by the distance-information acquisition unit 15 is used.

Distance-Information Acquisition Unit

The distance-information acquisition unit 15 has a function for acquiring distance information indicating the distance (i.e., subject distance) between the camera module 16 (i.e., imaging unit) and a subject. In detail, for example, the distance-information acquisition unit 15 acquires the subject distance by employing an active method, a passive method, or a combination of the two methods. Specifically, in the active method, the distance-information acquisition unit 15 radiates an infrared ray, an ultrasonic wave, or the like onto a subject and calculates the time it takes for a reflected wave to return from the subject or the distance therefrom based on a radiation angle. In the passive method, the distance-information acquisition unit 15 uses an image captured with a lens instead of using an infrared ray or the like. The distance-information acquisition unit 15 may acquire the subject distance for each subject (object) within a captured image or may acquire the subject distance for each pixel within a captured image.

Captured-Image Memory

The captured-image memory 17 is a storage medium that stores predetermined data therein and is realized by, for example, a flash memory, such as a card-type memory. Furthermore, in accordance with control performed by the CPU 10, the captured-image memory 17 stores therein an image captured by the camera module 16 and also stores therein the subject distance, which is acquired by the distance-information acquisition unit 15, of each subject within the captured image in correspondence with that subject (i.e., coordinate position of the subject within the captured image). Moreover, the captured-image memory 17 may store therein the subject distance for each pixel within the captured image.

Display Unit 18

The display unit 18 is a device that reproduces output information to the user from the digital camera 1. The display unit 18 is realized by, for example, a liquid crystal display (LCD) or an organic light-emitting diode (OLED) display.

Network I/F

The network I/F 19 is an interface for connecting to a network in a wireless or wired manner. In detail, for example, the network I/F 19 is connected to a network (i.e., cloud) via an access point by, for example, a wireless LAN or Wi-Fi (registered trademark). Furthermore, in accordance with control performed by the CPU 10, the network I/F 19 transmits, to the server 2 in the network, multiple captured images focused on multiple subjects and captured by the camera module 16.

CPU, ROM, and RAM

The CPU 10 controls each component of the digital camera 1. The CPU 10 is realized by, for example, a microprocessor. The ROM 11 stores therein a program to be executed by the CPU 10 for executing each of the above-described functions. The RAM 12 is utilized as a work area when the CPU 10 executes each of the above-described functions.

Figure 3:
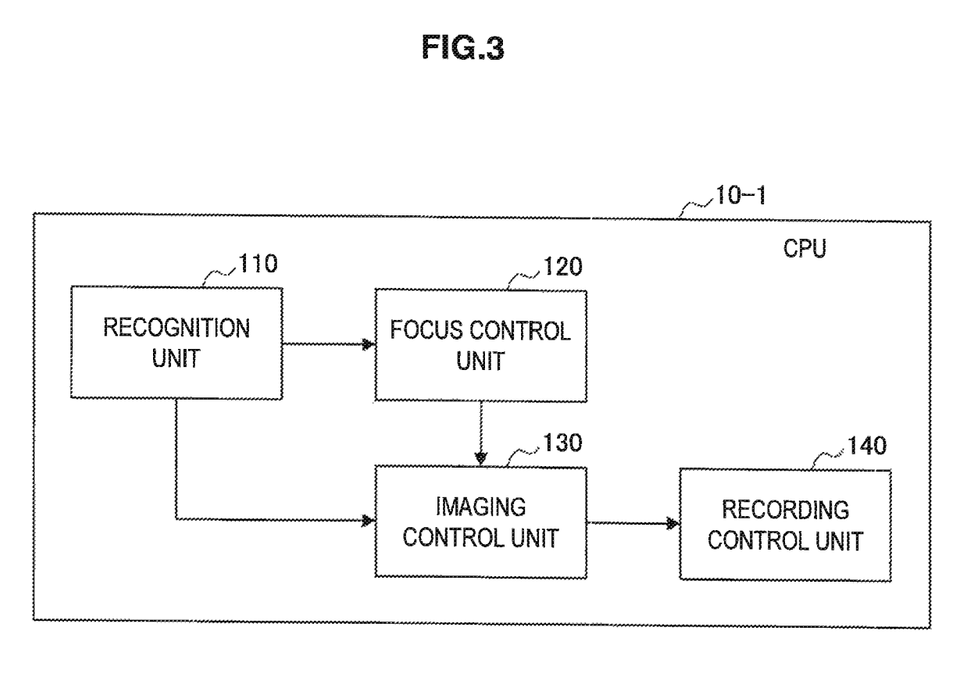
FIG. 3 is a block diagram illustrating an example of a functional configuration of a CPU according to this the embodiment.

A detailed functional configuration of the CPU 10 according to this embodiment will be described with reference to FIG. 3. FIG. 3 is a block diagram illustrating an example of a functional configuration of a CPU 10-1 according to this embodiment.

As shown in FIG. 3, the CPU 10-1 according to this embodiment includes a recognition unit 110, a focus control unit 120, an imaging control unit 130, and a recording control unit 140.

The recognition unit 110 recognizes multiple subjects (also referred to as "objects" hereinafter) from an image (e.g., through-the-lens image) captured by the camera module 16. The object recognition is performed based on, for example, image analysis (e.g., extraction of characteristics, contour, color, and shape, facial recognition, and still-object pattern recognition). Thus, by analyzing, for example, the through-the-lens image shown in FIG. 1, the recognition unit 110 can recognize multiple objects (subjects S1 to S4).

Furthermore, the recognition unit 110 may determine whether or not each object is movable and may include the determination result in the recognition result of the object. The determination of whether or not each object is movable may be performed by, for example, referring to a preregistered object model database (not shown). The model database includes information about the characteristics (such as color and shape) of each object and about whether or not the object is movable. For example, the recognition unit 110 refers to the model database based on the shape, size, color and so on of the subject S1 (object) extracted by performing image analysis on the through-the-lens image P so as to determine that the subject S1 (object) is a human and is movable. In addition to determining that a human or the face of a human is movable, the recognition unit 110 may recognize the parts of the face (e.g., nose, mouth, eyes, and eyebrows) as objects and determine whether or not each part is movable. For example, when the eyes are brought into focus, the recognition unit 110 determines that the eyes are movable, or when the nose is brought into focus, the recognition unit 110 determines that the nose is immovable.

The recognition unit 110 outputs the recognition result to the focus control unit 120 and the imaging control unit 130.

The focus control unit 120 controls the camera module 16 so as to sequentially bring multiple subjects (objects) within a captured image into focus. In detail, the focus control unit 120 sequentially brings the multiple objects (subjects S1 to S4) recognized by the recognition unit 110 into focus. In this case, the focusing order is not particularly limited and may be, for example, random.

When the imaging control unit 130 is notified that the objects are brought into focus by the focus control unit 120, the imaging control unit 130 controls the camera module 16 no as to cause the camera module 16 to perform an imaging process. In this case, the imaging control unit 130 controls the shutter speed setting in accordance with the recognition result output from the recognition unit 110 and indicating whether or not each object is movable. For example, if an object is movable, the imaging control unit 130 sets the shutter speed in accordance with whether to photograph the object without causing the details thereof to blur or to photograph the trajectory of the object. For example, when photographing the expression of a running person, it is desirable that the running person be photographed such that his/her expression is clearly recognizable without causing the details thereof to blur. On the other hand, for example, when photographing fireworks or a headlight (tail lamp) of a vehicle, it is desirable that the trajectory of the light be photographed so that the vividness thereof is expressed. Thus, the imaging control unit 130 sets the shutter speed to a high value when the details of a moving object are to be photographed, and sets the shutter speed to a low value when the trajectory of a moving object is to be photographed.

In addition to setting the shutter speed, the imaging control unit 130 may also set other imaging parameters, such as automatic exposure and aperture stop.

The recording control unit 140 performs control in response to a trigger from the user (e.g., pressing of the shutter button 13b) so as to record, onto a predetermined storage medium, multiple captured images of multiple subjects sequentially brought into focus by the focus control unit 120 and captured by the imaging control unit 130. In this embodiment, the predetermined storage medium is a storage medium (i.e., captured-image DB 24 shown in FIG. 6) of the server 2 at least having a combing function. The recording control unit 140 performs control for transmitting the multiple captured images to the server 2 from the network I/F 19 via the network and recording the images onto the storage medium (i.e., captured-image DB 24 shown in FIG. 6) of the server 2. In view of a situation, such as when located underground, where it is difficult to connect to the network and it is thus difficult to store the captured images into the storage medium of the server 2, the storage medium into which the captured images are stored by the recording control unit 140 may include a built-in storage medium in the digital camera 1. The images captured by sequentially bringing the multiple subjects into focus in accordance with this embodiment will be described with reference to FIG. 4.

Figure 4:
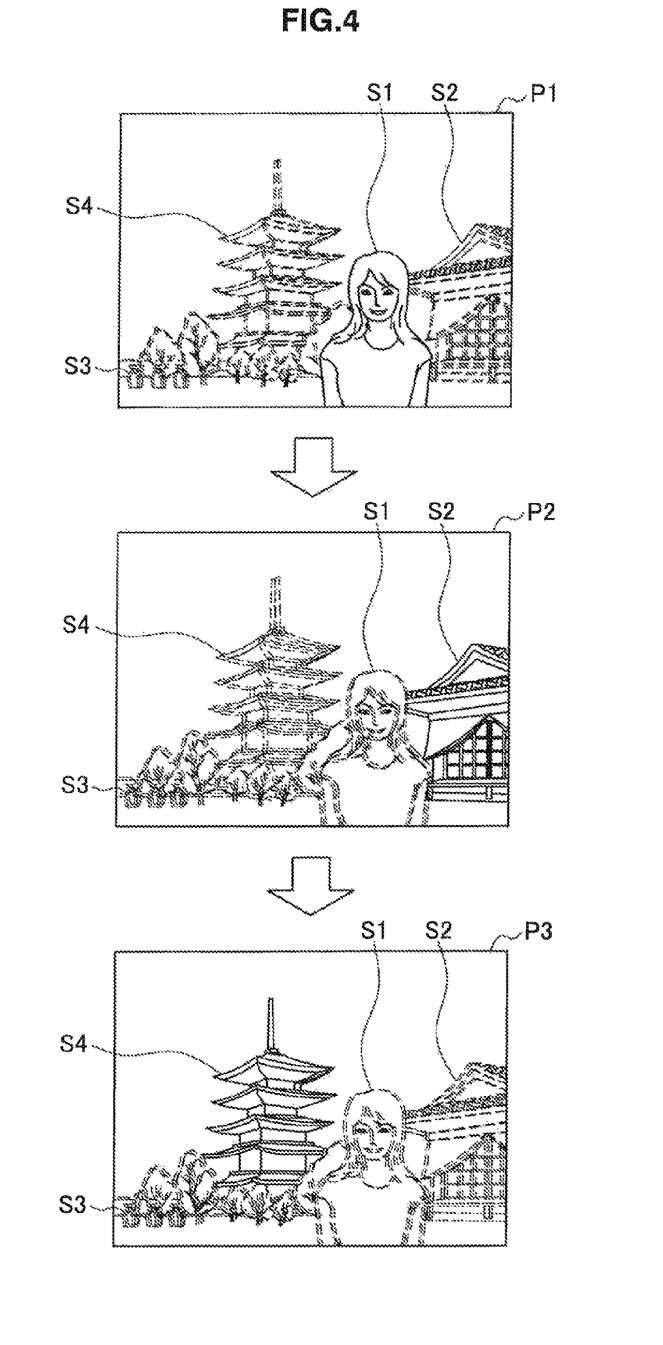
FIG. 4 illustrates an image captured by sequentially bringing multiple subjects into focus.

For example, as shown at the upper part of FIG. 4, the recording control unit 140 first brings the subject (object) S1 into focus in response to a trigger from the user, and records a captured image P1 captured in a state where the other subjects (objects) S2 to S4 are blurry. Then, as shown at the mid part of FIG. 4, the recording control unit 140 brings the subject (object) S2 into focus and records a captured image P2 captured in a state where the other subjects (objects) S1, S3, and S4 are blurry. Subsequently, as shown at the lower part of FIG. 4, the recording control unit 140 brings the subject (object) S4 into focus and records a captured image P3 captured in a state where the other subjects (objects) S1 to S3 are blurry. Accordingly, the recording control unit 140 performs control in response to a trigger from the user (e.g., pressing of the shutter button 13b) so as to record, onto the storage medium of the server 2 (i.e., captured-image DB 24 shown in FIG. 6), the multiple captured images captured by sequentially bringing the multiple objects into focus.

Furthermore, the recording control unit 140 may record, onto the predetermined storage medium, the distance information acquired by the distance-information acquisition unit 15 in correspondence with each object. In detail, the recording control unit 140 records the distance information of the multiple subjects S1 to S4 recognized by the recognition unit 110 in correspondence with the respective subjects S1 to S4 (or the coordinate positions of the respective subjects S1 to S4).

Furthermore, the recording control unit 140 may record, onto the predetermined storage medium, an image captured by focusing on one of the multiple objects as a first object hierarchical image and an image captured by zooming in on a portion of the first object hierarchical image by a predetermined amount as a second object hierarchical image. The object hierarchical images according to this embodiment will be described with reference to FIG. 5.

Figure 5:
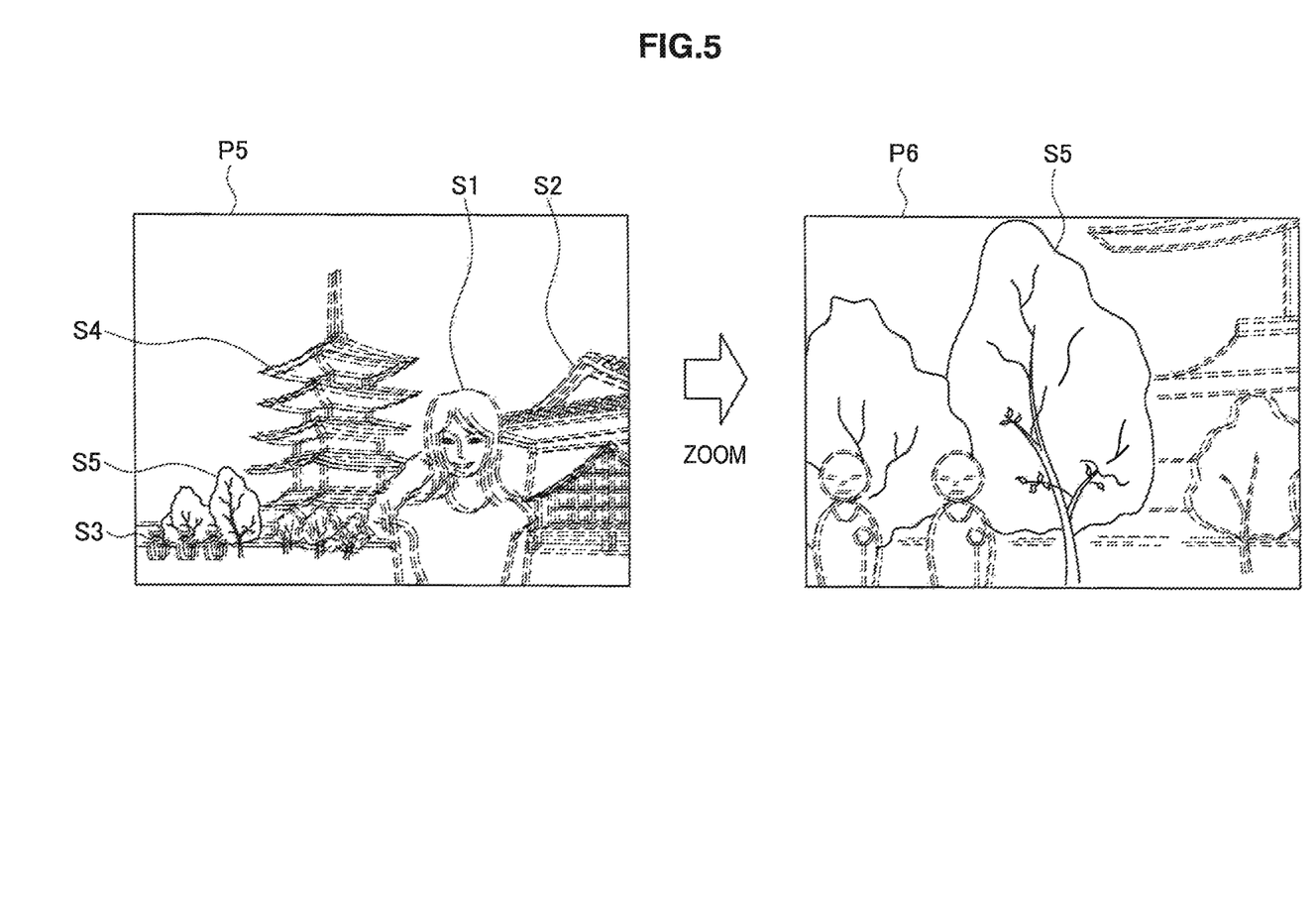
FIG. 5 illustrates object hierarchical images according to the embodiment.

As shown at the left side of FIG. 5, for example, the recording control unit 140 records, onto the predetermined storage medium, a captured image P5, which is captured in a state where a subject (object) S5 is in focus and the other subjects (objects) S1 to S4 are blurry, as a first object hierarchical image. Then, the recording control unit 140 zooms in on the subject (object) S5 by a predetermined amount and records, onto the predetermined storage medium, a captured image P6, which is captured with a resolution level that allows for recognition of branches and leaves of the subject S5 recognized as a tree, as a second object hierarchical image, as shown at the right side of FIG. 5. The second object hierarchical image (with a resolution level that allows the branches and leaves to be recognized as objects) is ranked as a lower hierarchical level relative to the first object hierarchical image (with a resolution level that allows the tree to be recognized as an object). Although zooming is normally performed with reference to the center of the angle of field, if the imaging lens of the camera module 16 according to this embodiment is of an independently movable type (i.e., the imaging direction thereof is independently changeable), zoom shooting is performed by controlling the orientation of the imaging lens so that the subject S5 is positioned at the center of the angle of field. Alternatively, if the imaging control unit 130 has a structure with multiple imaging lenses, zoom shooting is performed optically by using the imaging lens in which the subject S5 is positioned at the center of the angle of field. Furthermore, in the case where there are multiple imaging lenses, the aforementioned first object hierarchical image is generated by combining multiple captured images captured by the multiple imaging lenses.

Accordingly, in this embodiment, an image of an object located far away (with a large subject distance) is captured and stored by performing zooming thereon in advance so that when the user desires enlarged display of the captured image (specifically, a combined image generated by extracting the object) during browsing, a high-resolution image can be provided. Although the amount of zooming is not particularly limited, for example, the zooming may be performed up to a resolution level that allows individual trees included in a mountain, if the first object is a mountain, to be recognizable so that the objects can be hierarchized, and moreover, the zooming may be performed up to a resolution level that allows the leaves and branches included in each tree to be recognizable.

The configuration of the digital camera 1 according to this embodiment has been described above in detail. Next, the configuration of the server 2 according to this embodiment will be described with reference to FIG. 6.

2.2. Configuration of Server

Figure 6:
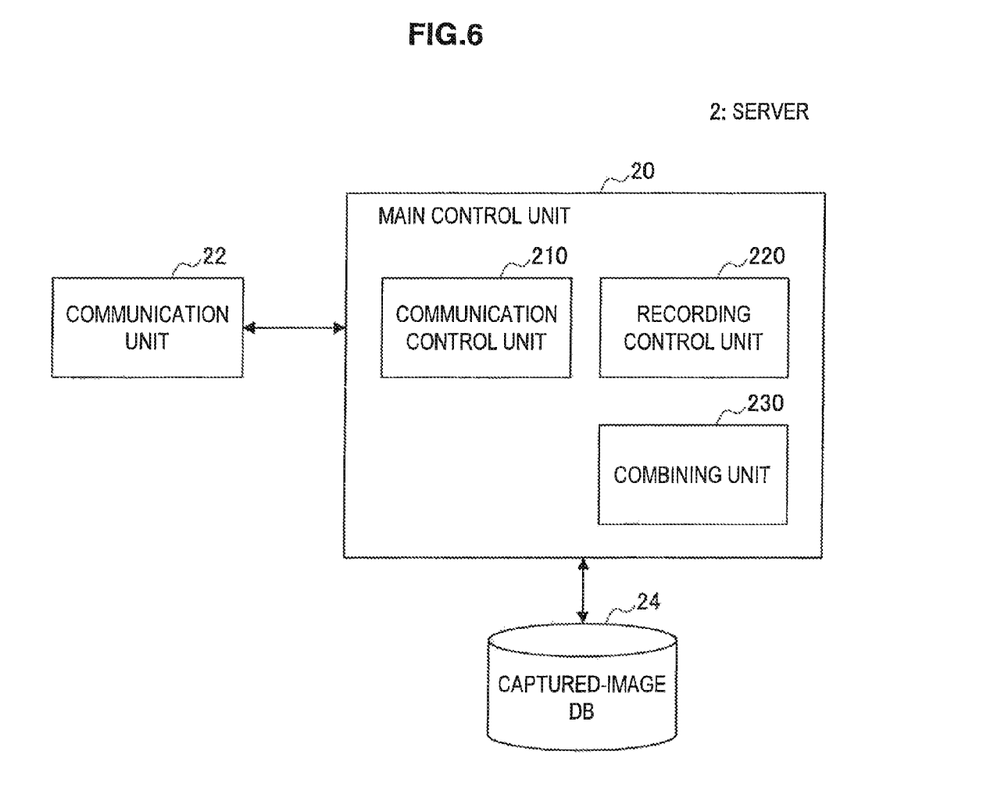
FIG. 6 is a block diagram illustrating an example of the configuration of a server according to the embodiment.

FIG. 6 is a block diagram illustrating an example of the configuration of the server 2 according to this embodiment. As shown in FIG. 6, the server 2 includes a main control unit 20, a communication unit 22, and the captured-image DB 24.

Main Control Unit

The main control unit 20 controls each component of the server 2. The main control unit 20 is realized by, for example, a microprocessor. Furthermore, as shown in FIG. 6, the main control unit 20 according to this embodiment functions as a communication control unit 210, a recording control unit 220, and a combining unit 230.

Communication Control Unit

The communication control unit 210 controls exchanging of data performed by the communication unit 22 relative to an external device. In detail, for example, the communication control unit 210 performs control such that a combined image generated by the combining unit 230 is transmitted from the communication unit 22 to the digital camera 1.

Recording Control Unit

The recording control unit 220 performs control such that captured images received by the communication unit 22 from the digital camera 1 (specifically, multiple captured images focused on respective multiple subjects) are recorded onto the captured-image DB 24. Furthermore, the recording control unit 220 may record the combined image generated by the combining unit 230 onto the captured-image DB 24. In this case, the recording control unit 220 records, onto the captured-image DB 24, the multiple in-focus subjects (objects) included in the combined image in correspondence with the distance information of the respective subjects.

Combining Unit

Based on the multiple captured images transmitted from the digital camera 1 and focused on the respective multiple subjects, the combining unit 230 performs a combining process by clipping an in-focus subject from each captured image (i.e., by prioritizing pixels corresponding to each in-focus object), thereby generating an image focused on all of the multiple subjects.

Captured-Image DB

The captured-image DB 24 is a storage medium that stores therein the captured images transmitted from the digital camera 1 and the combined image generated by the combining unit 230. Furthermore, the captured-image DB 24 includes ROM that stores therein a program to be executed by the main control unit 20 for executing each of the above-described functions, and RAM that is utilized as a work area when the main control unit 20 executes each of the above-described functions.

Communication Unit

The communication unit 22 exchanges data with an external device by wireless or wired connection. In detail, for example, the communication unit 22 is connected to a network by wired communication and exchanges data with the digital camera 1 via the network.

The configuration of the server 2 according to this embodiment has been described above in detail. Next, the operation of the photographic control system according to this embodiment will be described in detail with reference to FIG. 7.

3. Operation

Figure 7:
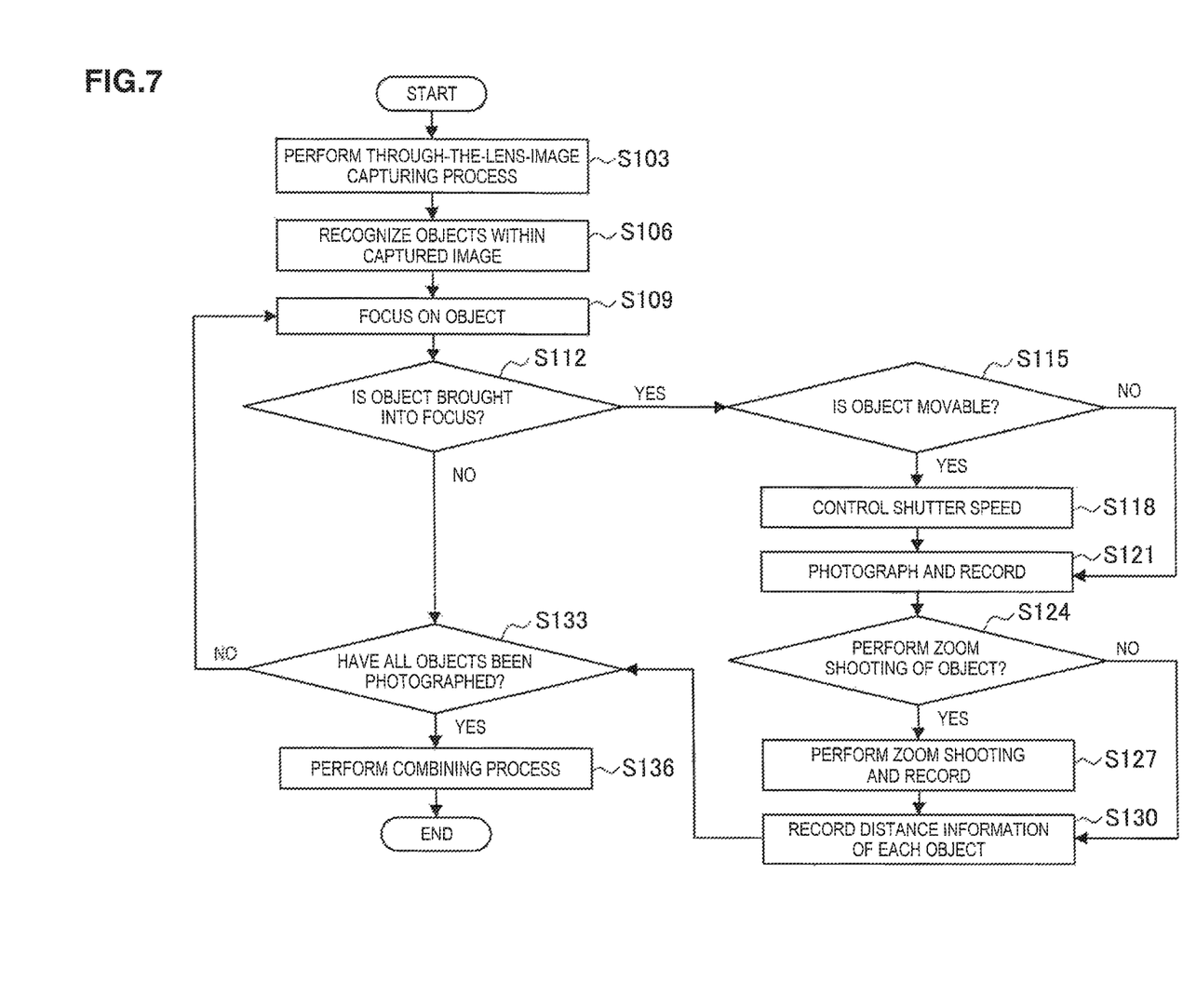
FIG. 7 is a flowchart illustrating the operation of the photographic control system according to the embodiment.

FIG. 7 is a flowchart illustrating the operation of the photographic control system according to this embodiment. As shown in FIG. 7, in step S103, the digital camera 1 commences a through-the-lens-image capturing process.

In step S106, the recognition unit 110 of the digital camera 1 recognizes objects within a captured image (i.e., through-the-lens image) captured as a result of the through-the-lens-image capturing process.

In step S109, the focus control unit 120 moves the imaging lens of the camera module 16 so as to focus on one of the multiple objects recognized by the recognition unit 110, and adjusts the focal length. In this case, distance information (i.e., subject distance between the camera module 16 and the object) acquired by the distance-information acquisition unit 15 is used.

If the object can be brought into focus (YES in step S112), the imaging control unit 130 acquires a determination result output from the recognition unit 110 and indicating whether or not the object is movable in step S115.

If the object is movable (YES in step S115), the imaging control unit 130 performs control for setting the shutter speed in accordance with how the object is to be photographed. In detail, as described above, if the details of the movable object are to be photographed, the shutter speed is set to a high value, whereas if the trajectory of the movable object is to be photographed, the shutter speed is set to a low value.

On the other hand, if the object is immovable or if there are no determination results output from the recognition unit 110 (i.e., if it is unclear whether the object is movable or not) (NO in step S115), the control of the shutter speed by the imaging control unit 130 is not performed.

Then, in step S121, the imaging control unit 130 controls the camera module 16 so as to execute an imaging process. Thus, a captured image that is focused on one of the multiple objects is acquired. Furthermore, in order to record the captured image onto the storage medium (i.e., captured-image DB 24) of the server 2 in the network, the recording control unit 140 performs control for transmitting the captured image from the network I/F 19. Although the captured image is transmitted from the digital camera 1 to the server 2 as an example, this embodiment is not limited to this configuration. For example, in the digital camera 1, an image of an in-focus subject region may be clipped from the captured image (i.e., pixels corresponding to an in-focus object may be prioritized), and the clipped image may be transmitted to the server 2.

Subsequently, if zoom shooting of the object is to be performed (YES in step S124), the imaging control unit 130 performs an imaging process by zooming in on a portion of the object (see FIG. 5). In this case, the recording control unit 140 performs control for recording the captured image (i.e., the captured image captured in step S121) prior to zooming as a first object hierarchical image and the captured image after zooming as a second object hierarchical image.

In step S130, the recording control unit 140 performs control for recording the distance information (i.e., subject distance) of each object recognized by the recognition unit 110 in correspondence with that object. The distance information of each object is acquired by the distance-information acquisition unit 15. Alternatively, the recording control of the distance information of each object performed by the recording control unit 140 may be performed after all of the objects have been photographed in step S133, which will be described below.

Until it is determined in step S133 that the focus shooting process has been completed for all of the multiple objects recognized by the recognition unit 110, steps S109 to S130 are repeated. In detail, if the focus shooting process has not been completed for all of the multiple objects (NO in step S133), the focus control unit 120 performs control in step S109 for bringing a subsequent object into focus. Accordingly, the digital camera 1 can acquire multiple captured images focused on the multiple objects recognized by the recognition unit 110 and transmit the captured images to the server 2.

In step S136, based on the multiple captured images transmitted from the digital camera 1, the combining unit 230 of the server 2 generates a combined image that is focused on the multiple objects. In detail, for example, the combining unit 230 clips images of in-focus subject regions (prioritizes pixels corresponding to in-focus objects) from the multiple captured images and combines the multiple clipped images so as to generate an image focused on the multiple objects. Accordingly, the photographic control system according to this embodiment can provide an image focused on all of the multiple Objects to the user.

The process described above may be performed in response to one operation performed by the user (such as one pressing of the shutter button 13b). In detail; for example, after the through-the-lens-image capturing process shown in step S103, the digital camera 1 commences the process from step S106 and onward in response to pressing of the shutter button 13b by the user.

4. Another Embodiment

4.1. Another Example of Focus Control

Although control is performed to sequentially bring the multiple objects recognized by the recognition unit 110 into focus in the above-described embodiment, the focus control according to the embodiment of the present disclosure is not limited thereto. Focus control according to another embodiment of the present disclosure will be described in detail below with reference to FIGS. 8 and 9. A photographic control system according to this embodiment is constituted of the digital camera 1 (control device) and the server 2 and is only different from that in the above-described embodiment in terms of the functional configuration of the CPU 10 included in the digital camera 1.

Functional Configuration

Figure 8:
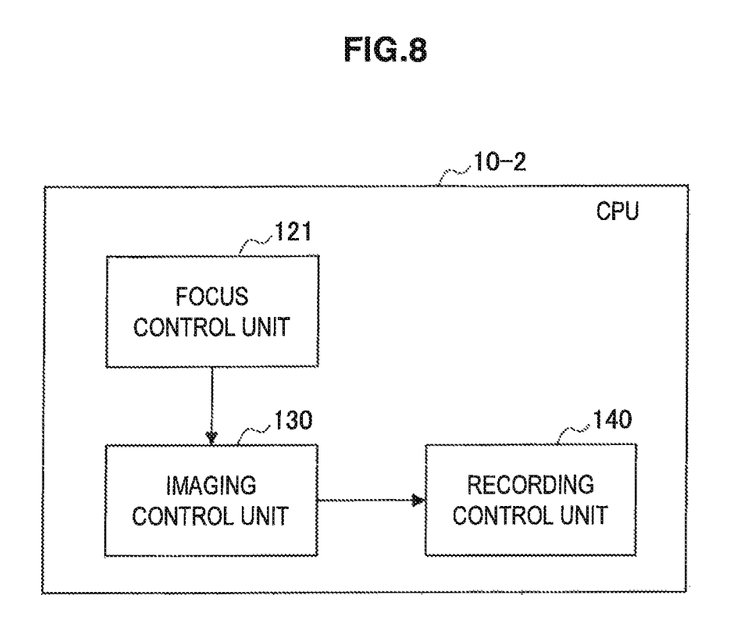
FIG. 8 is a block diagram illustrating a functional configuration of a CPU in a case where focus control according to another embodiment of the present disclosure is realized.

FIG. 8 is a block diagram illustrating a functional configuration of a CPU 10-2 included in the digital camera 1 in the case where the focus control according to the other embodiment of the present disclosure is realized. As shown in FIG. 8, the CPU 10-2 functions as a focus control unit 121, an imaging control unit 130, and a recording control unit 140.

The focus control unit 121 shifts the focal position (i.e., adjusts the focal length) from the far side toward the near side or from the near side toward the far side so as to sequentially bring multiple subjects within a through-the-lens image into focus. For example, in a case where the through-the-lens image P shown in FIG. 1 is acquired, the focus control unit 121 shifts the focal position from the far side toward the near side so as to sequentially bring the subjects S4, S3, S2, and S1 into focus.

The imaging control unit 130 performs control such that images are captured at timings at which the subjects are brought into focus by the focus control unit 121.

Furthermore, when the subjects are brought into focus by the focus control unit 121, the recording control unit 140 performs control for recording the captured images captured by the imaging control unit 130 onto a predetermined storage medium (specifically, the captured-image DB 24 of the server 2).

As described above, the focus control unit 121 shifts the focal position from the far side toward the near side or from the near side toward the far side so as to sequentially bring the multiple subjects within the through-the-lens image into focus, whereby multiple captured images captured when the multiple subjects are brought into focus are acquired.

Operation

Figure 9:
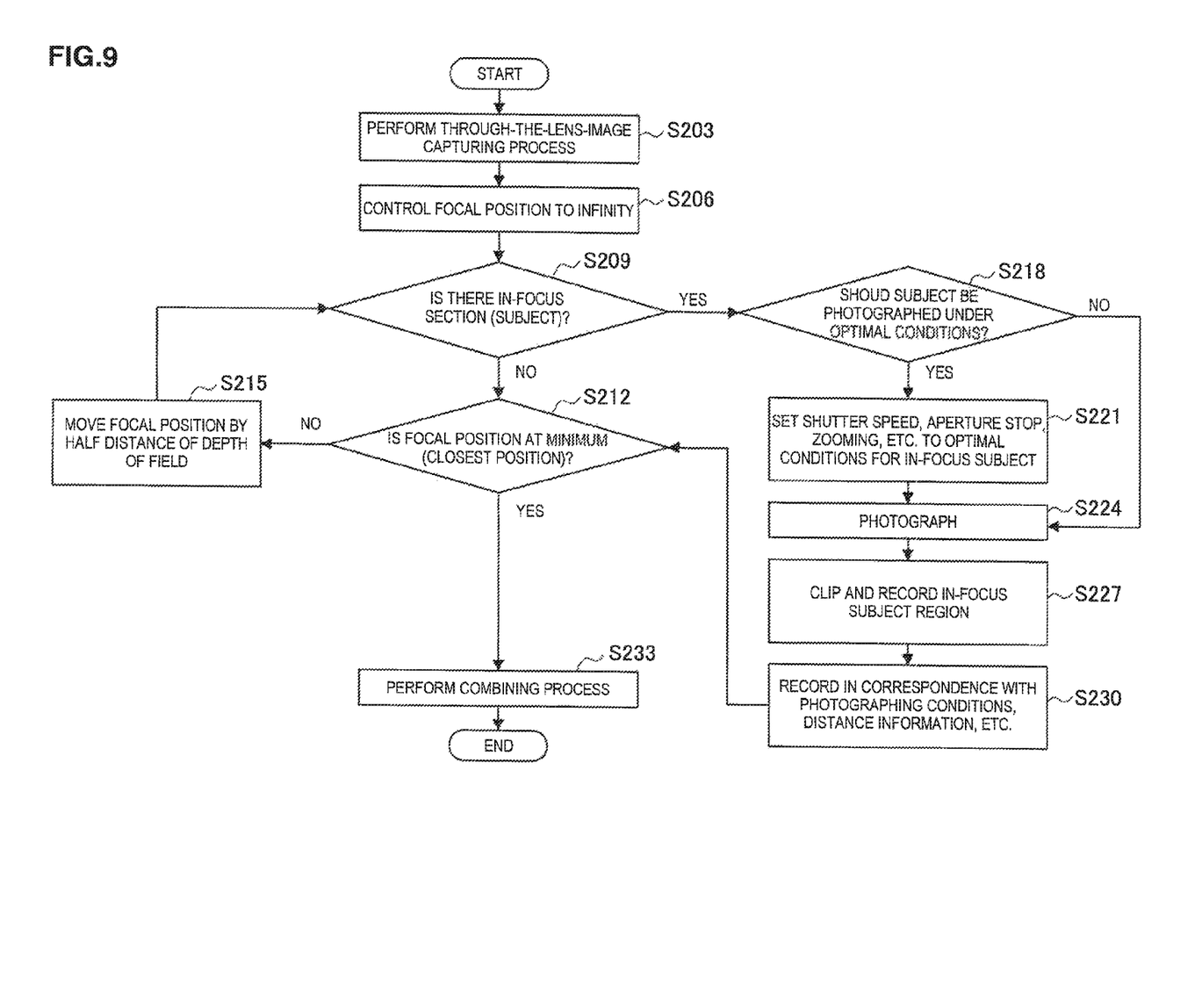
FIG. 9 is a flowchart illustrating the operation of the focus control according the other embodiment of the present disclosure.

Next, the operation in this embodiment will be described with reference to FIG. 9. FIG. 9 is a flowchart illustrating the operation of the focus control according to the other embodiment of the present disclosure. As shown in FIG. 9, in step S203, the digital camera 1 commences a through-the-lens-image capturing process. The user adjusts the framing by moving the digital camera 1 while checking an image captured as a result of the through-the-lens-image capturing process.

In step S206, the focus control unit 121 controls the focal position to infinity.

In step S209, the focus control unit 121 determines whether or not there is an in-focus section (subject) in the infinitely controlled state.

Then, if there is no in-focus section (NO in step S209), the focus control unit 121 determines whether or not the focal position (i.e., focal length) is at a minimum (i.e., at a position closest to the camera module 16) in step S212. In this case, since the focal position is controlled to infinity, it is determined that the focal position is not at the minimum.

Then, if it is determined that the focal position is not at the minimum (NO in step S212), the focus control unit 121 moves the focal position by half the distance of the depth of field in step S215. For example, in a case where the focal position (i.e., focal length) is 50 m and the depth of field is between 30 m and 80 m, if the focal position is to be brought closer, the focus control unit 121 moves the focal position to a 40-m position, which is located at a halfway point between 30 m and 50 m. If the focal position is to be brought farther away, the focus control unit 121 moves the focal position to a 65-m position, which is located at a halfway point between 50 m and 80 m. Although the focal position is moved by half the distance of the depth of field as an example, the moving distance of the focal position in this embodiment is not limited thereto. For example, the focal position may be moved by one quarter of the distance of the depth of field or may be moved by a preset fixed distance regardless of the depth of field.

Subsequently, if it is determined that there is an in-focus section in step S209 (YES in step S209), the imaging control unit 130 determines whether or not the subject (object) is to be photographed under optimal conditions in step S218. The determination of whether or not the subject is to be photographed under optimal conditions may be performed in accordance with, for example, whether or not imaging parameters are set in an automatic mode. In detail, the imaging control unit 130 determines that the subject is to be photographed under optimal conditions if the imaging parameters are set in the automatic mode or determines that optimal conditions are not to be set if the imaging parameters are set in a manual mode.

If the subject is to be photographed in optimal conditions (YES in step S218), the imaging control unit 130 sets the imaging parameters, such as the shutter speed, aperture stop, and zooming, for the in-focus subject to optimal conditions in step S221.

On the other hand, if optimal conditions are not to be set (NO in step S218), the imaging control unit 130 does not perform control for setting the imaging parameters.

In step S224, the imaging control unit 130 executes an imaging process by controlling the camera module 16. Thus, a captured image that is focused on one of the multiple subjects is acquired.

In step S227, the recording control unit 140 performs control for clipping an image of an in-focus subject region from the captured image (i.e., prioritizing pixels corresponding to an in-focus object) and transmitting the clipped image from the network I/F 19 so as to record the clipped image onto the storage medium of the server 2. Although the image of the in-focus subject region is clipped from the captured image in the digital camera 1 as an example, this embodiment is not limited to this configuration. For example, the captured image may be transmitted from the digital camera 1 to the server 2, and the image of the in-focus subject region may be clipped from the captured image (i.e., pixels corresponding to the in-focus object may be prioritized) in the server 2.

In step S230, the recording control unit 140 performs control for recording, onto the server 2, photographing conditions, the distance information indicating the distance from the in-focus subject, and so on in correspondence with the subject coordinate position within the captured image or the clipped image of the subject region.

Until it is determined in step S212 that the focal position is at the minimum, steps S215, S209, and S218 to S230 are repeated. In detail, if it is determined that the focal position is not at the minimum (NO in step S212), the focus control unit 120 further moves the focal position in step S215. Consequently, according to this embodiment, the focal position is gradually moved so that in-focus subjects can be sequentially photographed.

In step S233, based on multiple captured images transmitted from the digital camera 1, the combining unit 230 of the server 2 generates a combined image focused on the multiple objects. Consequently, the photographic control system according to this embodiment can provide an image focused on all of the multiple objects to the user.

The focus control according to the other embodiment of the present disclosure has been described above.

4.2. Configuration of Stand-Alone Digital Camera

Although the photographic control system according to each of the above-described embodiments is constituted of the digital camera 1 (control device) and the server 2, the main function of the photographic control system according to this embodiment can be executed by the digital camera 1 alone. Such a photographic control system according to the embodiment of the present disclosure that is realized by the digital camera 1 alone will be described below with reference to FIG. 10. The configuration of the digital camera 1 (control device) according to this embodiment only differs from those in the above-described embodiments in terms of the functional configuration of the CPU 10 included in the digital camera 1. Furthermore, since the digital camera 1 according to this embodiment does not have to transmit a captured image to the server 2, the network I/F 19 may be omitted.

Figure 10:
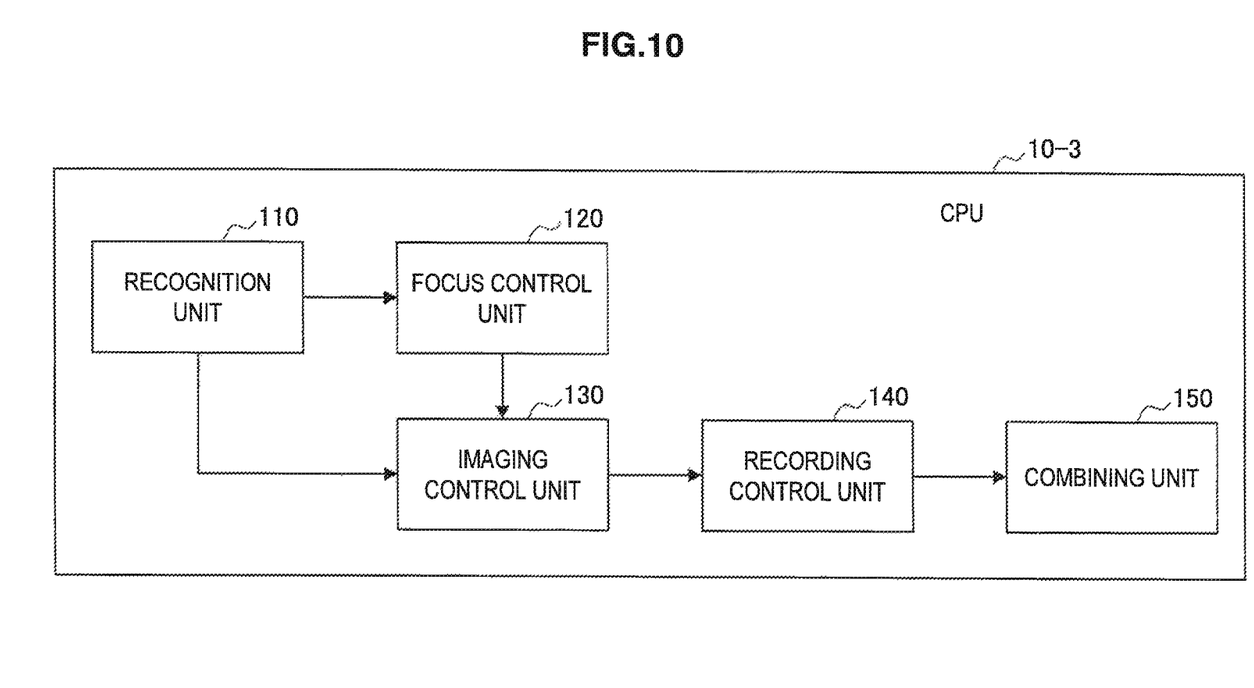
FIG. 10 is a block diagram illustrating a functional configuration of a CPU in a case where the photographic control system is realized by a stand-alone digital camera.

FIG. 10 is a block diagram illustrating a functional configuration of a CPU 10-3 included in the digital camera 1 in the case where the photographic control system is realized by the digital camera 1 alone. As shown in FIG. 10, the CPU 10-3 functions as a recognition unit 110, a focus control unit 120, an imaging control unit 130, a recording control unit 140, and a combining unit 150.

Because the recognition unit 110, the focus control unit 120, and the imaging control unit 130 have configurations similar to those described with reference to FIG. 3, descriptions thereof will be omitted here.

The recording control unit 140 performs control for recording, onto a built-in storage medium (specifically, the captured-image memory 17) of the digital camera 1, multiple captured images of multiple subjects sequentially brought into focus by the focus control unit 120 and captured by the imaging control unit 130. Furthermore, the recording control unit 140 may perform control for recording, onto the captured-image memory 17, a combined image generated by the combining unit 150, which will be described below. In this case, the recording control unit 140 records the multiple in-focus subjects (objects) included in the combined image in correspondence with the distance information of the respective subjects.

Based on the multiple captured images focused on the multiple subjects and recorded by the recording control unit 140, the combining unit 150 performs a combining process by clipping an in-focus subject from each captured image (i.e., by prioritizing pixels corresponding to each in-focus object), thereby generating an image focused on all of the multiple subjects.

Accordingly, the combining process performed in the server 2 is performed in the digital camera 1 so that even when it is difficult to communicate with the server 2, an image focused on all of the multiple subjects can be provided to the user.

5. Conclusion

As described above, the photographic control system according to each of the above-described embodiments can provide a sharp image that is focused on multiple subjects (objects) and that has little blurriness. In detail, the photographic control system automatically performs an imaging process by sequentially bringing multiple subjects within a through-the-lens image into focus in response to a trigger from the user (e.g., pressing of the shutter button 13*b*) and generates an image focused on the multiple subjects (objects) based on multiple captured images.

Furthermore, in the photographic control system according to each embodiment, the distance information (i.e., subject distance information) of the multiple subjects can be recorded in correspondence with the respective subjects included in the combined image.

Since a photographing process is normally performed by focusing only on one subject, one piece of distance information is added to the captured image. In contrast, in each of the above-described embodiments, distance information (i.e., subject distance information) is corresponded with each of the multiple subjects within an image. This distance information is useful when subsequently performing hierarchization based on the positional relationship between objects or when combining an image of the objects with an image of another object. For example, in a case where a combined image generated in each embodiment is to be further combined with an image of an object captured in another scene, the hierarchical relationship between layers during the image combining process is determined by referring to the distance information recorded in correspondence with the object to be combined and the distance information of the objects within the combined image. For example, if the distance information of the object to be combined indicates a position between the subjects S1 and S2 shown in FIG. 1, the combining process is performed by setting the layer of the aforementioned object under the layer of the subject S1 and over the layer of the subject S2.

Although preferred embodiments of the present disclosure have been described above in detail with reference to the appended drawings, the present technology is not limited to these examples. It should be understood by those having a general knowledge of the technical field of the present disclosure that various modifications and alterations may occur within the technical scope of the appended claims or the equivalents thereof, and such modifications and alterations are included in the technical scope of the present disclosure.

For example, a computer program for achieving the function of the digital camera 1 or the server 2 may be created in the built-in hardware units, such as the CPU, ROM, and the RAM, in the digital camera 1 or the server 2. Moreover, a computer-readable storage medium having the computer program stored therein is also provided.

Furthermore, the order in which the steps are performed in the process of the digital camera 1 or the server 2 in this specification is not limited to the chronological order disclosed in the appended sequence diagrams or flowcharts. For example, the steps in the process of the digital camera 1 or the server 2 may be performed in an order different from the order described in the sequence diagrams or flowcharts or may be performed concurrently.

Additionally, the present technology may also be configured as below.

(1) A control device including:
a focus control unit configured to perform control so as to sequentially bring multiple subjects within a captured image into focus; and
a recording control unit configured to perform control in response to a trigger from a user so as to record, onto a storage medium, captured images of the multiple subjects sequentially brought into focus by the focus control unit.

(2) The control device according to (1), further including:
a recognition unit configured to recognize objects within the captured image as the multiple subjects.

(3) The control device according to (2), further including:
an acquisition unit configured to acquire a distance between each object recognized by the recognition unit and an imaging unit that has captured the image,
wherein the recording control unit records, onto the storage medium, distance information acquired by the acquisition unit in correspondence with each object.

(4) The control device according to (2) or (3),
wherein the recognition unit determines whether or not each object is movable, and
wherein the control device further includes an imaging control unit configured to control a shutter speed setting to be applied when performing an imaging process by bringing the object into focus in accordance with a determination result indicating whether or not the object is movable.

(5) The control device according to any one of (1) to (4),
wherein the recording control unit records, onto the storage medium, an image captured by focusing on one of multiple objects as a first object hierarchical image and an image captured by zooming in on a portion of the first object hierarchical image by a predetermined amount as a second object hierarchical image.

(6) The control device according to (1),
wherein the focus control unit shifts a focal position from a far side toward a near side or from the near side toward the far side, and
wherein the recording control unit performs control so as to record, onto the storage medium, the images captured when the multiple subjects are brought into focus by the focus control unit.

(7) The control device according to any one of (1) to (6), further including:
a combining unit configured to perform a combining process based on the multiple images recorded by the recording control unit such that pixels corresponding to each in-focus object are prioritized.

(8) A non-transitory computer-readable storage medium having a program stored therein, the program causing a computer to function as:
a focus control unit configured to perform control so as to sequentially bring multiple subjects within a captured image into focus; and
a recording control unit configured to perform control in response to a trigger from a user so as to record, onto a storage medium, captured images of the multiple subjects sequentially brought into focus by the focus control unit.

What is claimed is:

1. A control device comprising:
circuitry configured to
control to focus on a plurality of objects at different focal lengths,
determine whether one of the plurality of objects is movable, wherein the determination is performed by referring to a preregistered object model database that includes characteristic information about a preregistered classes of objects,
control a shutter speed setting for capturing a first image, based on an object recognition of one of the plurality of objects and also based on the determination of the one of the plurality of objects as being movable, and
control capture of a plurality of images including the first image.

2. The control device according to claim 1, wherein the circuitry is further configured to
acquire a distance between one of the plurality of objects that are recognized and an imaging unit that has captured the plurality of images, and
control a recording of acquired distance information in correspondence with each respective object.

3. The control device according to claim 1, wherein the circuitry is further configured to
control a recording of an image captured by focusing on one of plurality of objects as a first object hierarchical image and an image captured by zooming in on a portion of the first object hierarchical image by a predetermined amount as a second object hierarchical image.

4. The control device according to claim 1, wherein the circuitry is further configured to
control sequential shifting of a focal position from a far side toward a near side or from the near side toward the far side, and
control a recording of the images captured when the plurality of objects are brought into focus.

5. The control device according to claim 4, wherein the focal position is shifted by a distance related to limits of effective focal range and the focal position.

6. The control device according to claim 1, wherein the circuitry is further configured to
perform a combining process based on the plurality of images such that pixels corresponding to each in-focus object are prioritized.

7. The control device according to claim 1, wherein the control of capturing the plurality of images is performed in response to an input from a user.

8. The control device according to claim 1, wherein at least one of the plurality of objects is a person.

9. The control device according to claim 1, wherein the preregistered object model database includes characteristic information regarding a face of a human.

10. The control device according to claim 9, wherein the characteristic information includes information regarding a shape of the face.

11. The control device according to claim 1, wherein the one of the plurality of objects is classified into one of the preregistered classes of objects based on the object recognition.

12. A non-transitory computer-readable storage medium having embodied thereon a program, which when executed by a computer causes the computer to execute a method, the method comprising:
controlling to focus on a plurality of objects at different focal lengths;

determining whether one of the plurality of objects is movable, wherein the determination is performed by referring to a preregistered object model database that includes characteristic information about a preregistered classes of objects;

controlling a shutter speed setting for capturing a first image, based on an object recognition of one of the plurality of objects and also based on the determination of the one of the plurality of objects as being movable; and controlling capture of a plurality of images including the first image.

13. The non-transitory computer-readable storage medium according to claim 12, wherein at least one of the plurality of objects is a person.

14. The non-transitory computer-readable storage medium according to claim 12, wherein the preregistered object model database includes characteristic information regarding a face of a human.

15. The non-transitory computer-readable storage medium according to claim 14, wherein the characteristic information includes information regarding a shape of the face.

16. A computer-implemented method, the method comprising:

controlling to focus on a plurality of objects at different focal lengths;

determining whether one of the plurality of objects is movable, wherein the determination is performed by referring to a preregistered object model database that includes characteristic information about a preregistered classes of objects;

controlling a shutter speed setting for capturing a first image, based on an object recognition of one of the plurality of objects and also based on the determination of one of the plurality of object as being movable; and controlling capture of a plurality of images including the first image.

* * * * *